(12) United States Patent
Burch et al.

(10) Patent No.: US 11,737,391 B2
(45) Date of Patent: Aug. 29, 2023

(54) SUGARCANE HARVESTER CHOPPER SYSTEM WITH TIMING-ADJUSTMENT TOOL

(71) Applicant: DEERE & COMPANY, Moline, IL (US)

(72) Inventors: Guy Burch, Thibodaux, LA (US); Michael L. Halbrook, Thibodaux, LA (US); Javier J. Moscoso, Madrid (ES); Prashant M. Jundale, Pune (IN)

(73) Assignee: Deere & Company, Moline, IL (US)

( * ) Notice: Subject to any disclaimer, the term of this patent is extended or adjusted under 35 U.S.C. 154(b) by 434 days.

(21) Appl. No.: 17/009,314

(22) Filed: Sep. 1, 2020

(65) Prior Publication Data

US 2021/0329834 A1    Oct. 28, 2021

(30) Foreign Application Priority Data

Apr. 27, 2020   (IN) .............................. 202021017984

(51) Int. Cl.
   *A01D 45/10* (2006.01)
   *A01D 69/06* (2006.01)
   *A01D 43/08* (2006.01)

(52) U.S. Cl.
   CPC .............. *A01D 43/08* (2013.01); *A01D 45/10* (2013.01); *A01D 69/06* (2013.01)

(58) Field of Classification Search
   CPC ........ A01D 43/08; A01D 45/10; A01D 69/06; B23Q 16/00; B23Q 5/20
   See application file for complete search history.

(56) References Cited

U.S. PATENT DOCUMENTS

| | | | | |
|---|---|---|---|---|
| 3,785,223 A | * | 1/1974 | Steele | B23Q 16/065 74/818 |
| 4,065,912 A | * | 1/1978 | Quick | A01D 45/10 83/345 |
| 4,677,813 A | * | 7/1987 | Stiff | A01D 45/10 56/13.9 |
| 5,622,034 A | * | 4/1997 | Dommert | F16D 7/025 192/56.6 |
| 5,890,353 A | * | 4/1999 | Brown | A01D 45/10 241/293 |
| 9,433,149 B2 | | 9/2016 | Mixon et al. | |
| 10,278,332 B2 | | 5/2019 | Burch | |
| 2016/0223025 A1 | * | 8/2016 | Vergara | A01F 29/14 |

* cited by examiner

*Primary Examiner* — Thomas B Will
*Assistant Examiner* — Julia C Tran (57) ABSTRACT

A chopper system for a sugarcane harvester comprises a chopper and a timing-adjustment tool. The chopper comprises a first chopper drum mounted for rotation about a first axis of rotation and comprising blades, a second chopper drum mounted for rotation about a second axis of rotation and comprising blades that cooperate with the blades of the first chopper drum to sever sugarcane stalks into billets upon rotation of the first and second chopper drums respectively about the first and second axes of rotation, and a gearbox that coordinates rotation of the first and second chopper drums relative to one another to establish a timing of operation between the blades of the first and second chopper drums. The timing-adjustment tool removably mounts to the chopper to adjust the timing of operation.

14 Claims, 7 Drawing Sheets

SUGARCANE HARVESTER CHOPPER SYSTEM WITH TIMING-ADJUSTMENT TOOL

FIELD OF THE DISCLOSURE

The present disclosure relates to a chopper for a sugarcane harvester.

BACKGROUND OF THE DISCLOSURE

A sugarcane harvester typically has a chopper that severs a mat of sugarcane stalks into segments called "billets." The chopper has a first chopper drum and a second chopper drum, each with a set of blades and rotatable about a respective axis of rotation. The blades of the chopper drums cooperate to sever the stalks into billets. Blade wear can affect the timing of operation between the blades of the first chopper drum and the blades of the second chopper drum, impacting the quality of cut of the stalks.

SUMMARY OF THE DISCLOSURE

According to an aspect of the present disclosure, there is disclosed a chopper system for a sugarcane harvester. The chopper system comprises a chopper and a timing-adjustment tool. The chopper comprises a first chopper drum mounted for rotation about a first axis of rotation and comprising blades, a second chopper drum mounted for rotation about a second axis of rotation and comprising blades that cooperate with the blades of the first chopper drum to sever sugarcane stalks into billets upon rotation of the first and second chopper drums respectively about the first and second axes of rotation, and a gearbox that coordinates rotation of the first and second chopper drums relative to one another to establish a timing of operation between the blades of the first chopper drum and the blades of the second chopper drum. The gearbox comprises a rotor connected to the first chopper drum to rotate therewith, a first gear, fasteners fastening the rotor to the first gear for rotation of the first gear with the first chopper drum, and a second gear connected to the second chopper drum to rotate therewith. The first and second gears are rotatably connected with one another. The rotor is rotatable relative to the first gear upon loosening of the fasteners. The timing-adjustment tool removably mounts to a first fastener of the fasteners and the rotor to rotate the rotor relative to the first gear to adjust the timing of operation between the blades of the first chopper drum and the blades of the second chopper drum when the fasteners are loosened. The timing-adjustment tool permits fine adjustment of the timing.

The above and other features will become apparent from the following description and accompanying drawings.

BRIEF DESCRIPTION OF THE DRAWINGS

The detailed description of the drawings refers to the accompanying figures in which.

DETAILED DESCRIPTION OF THE DRAWINGS

Figure 1:
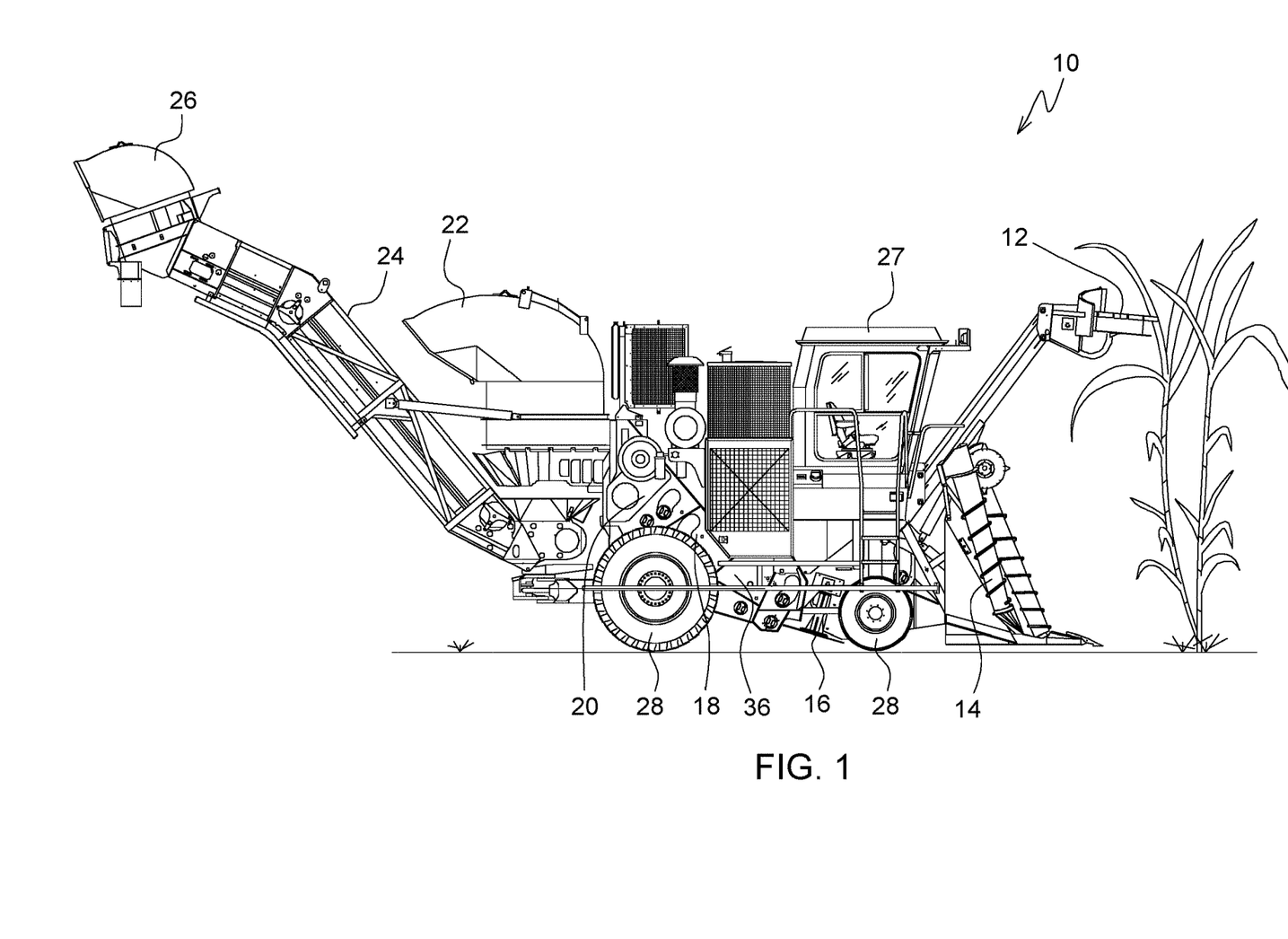
FIG. 1 is a side elevation view showing a sugarcane harvester.

Referring to FIG. 1, a sugarcane harvester 10 illustratively includes a topper 12, a left and a right crop divider scroll 14 (the left crop divider scroll 14 not shown), an upper knockdown roller and a lower knockdown roller (the knockdown rollers not shown), a basecutter assembly 16, a feeder 18, a chopper 20, a primary extractor 22, an elevator 24, and a secondary extractor 26. The topper 12 cuts off a leafy top portion of sugarcane plants. The left and right crop divider scrolls 14 lift the sugarcane plants for feeding into the throat of the harvester 10.

The basecutter assembly 16 severs sugarcane stalks knocked down forwardly by the knockdown rollers and feeds the severed sugarcane stalks to the feeder 18. The feed system 18 receives from the basecutter assembly 16 a mat of severed sugarcane and feeds the mat rearwardly. The chopper 20 receives the mat from the feeder 18 and cuts the sugarcane stalks into billets. The primary extractor 22 is positioned downstream from the chopper 20, separates debris, including, for example, crop residue (e.g., leafy material), from the billets, and removes the debris from the harvester 10.

The elevator 24 is positioned at the rear of the harvester 10 to receive the cleaned flow of billets, and conveys the billets to an elevated position where the billets are discharged into a wagon to be hauled away. The secondary extractor 26 (some harvester embodiments may not have a secondary extractor) is positioned near the top of the elevator 24, and further separates debris from the billets to remove the debris from the harvester 10.

The harvester 10 comprises an operator's station 27 and traction elements 28. A human operator may operate the harvester 10 from the operator's station 27. The traction elements 28 are positioned on the left and right sides of the harvester 10 to propel the harvester 10 along the ground. Each traction element 28 may be, for example, a track unit or a ground-engaging wheel (e.g., there is one track unit on each side of the harvester 10, as shown, for example, with respect to the right side in FIG. 1).

Figure 2:
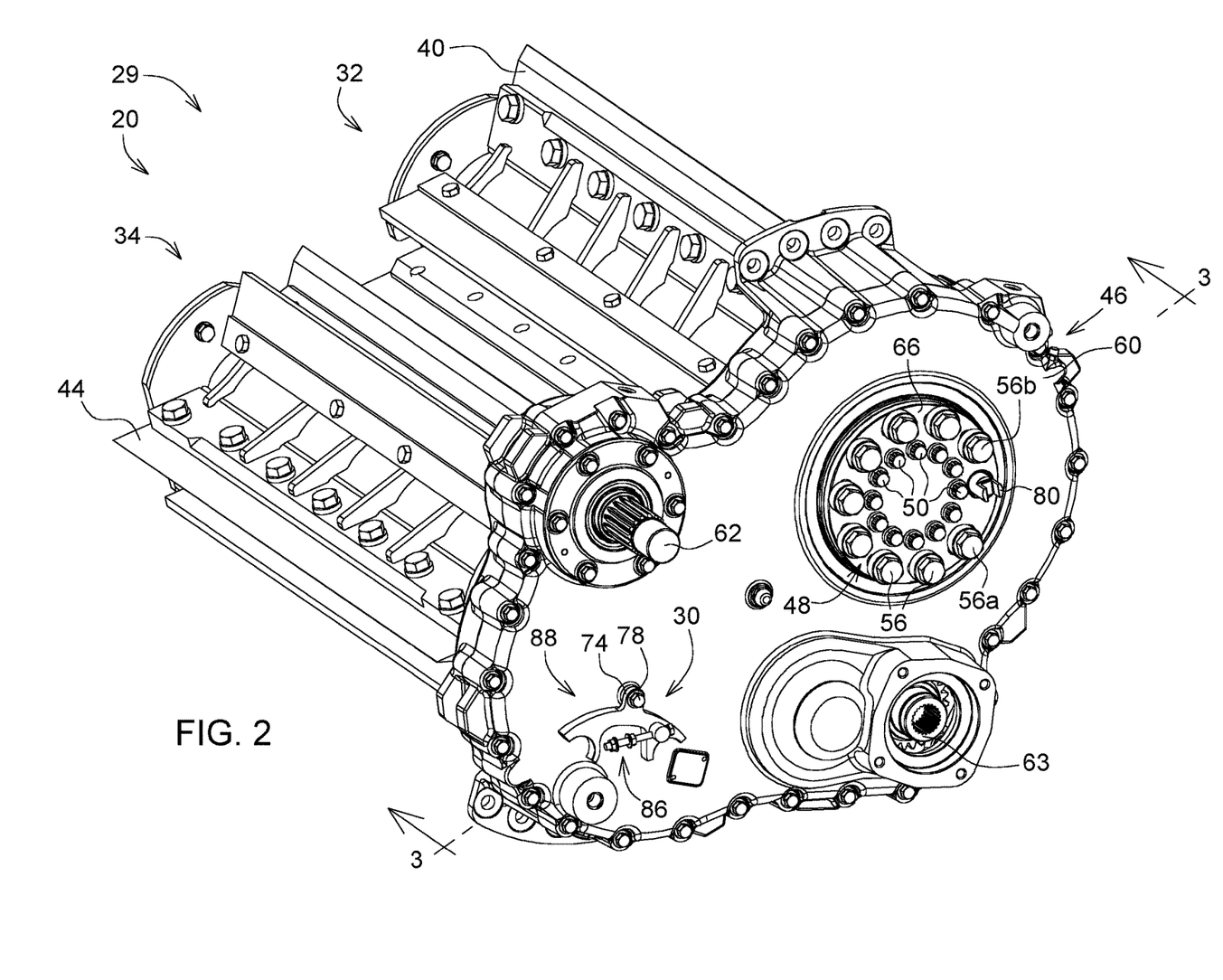
FIG. 2 is a perspective view showing a chopper of the sugarcane harvester, the chopper including a first chopper drum and a second chopper drum.
Figure 3:
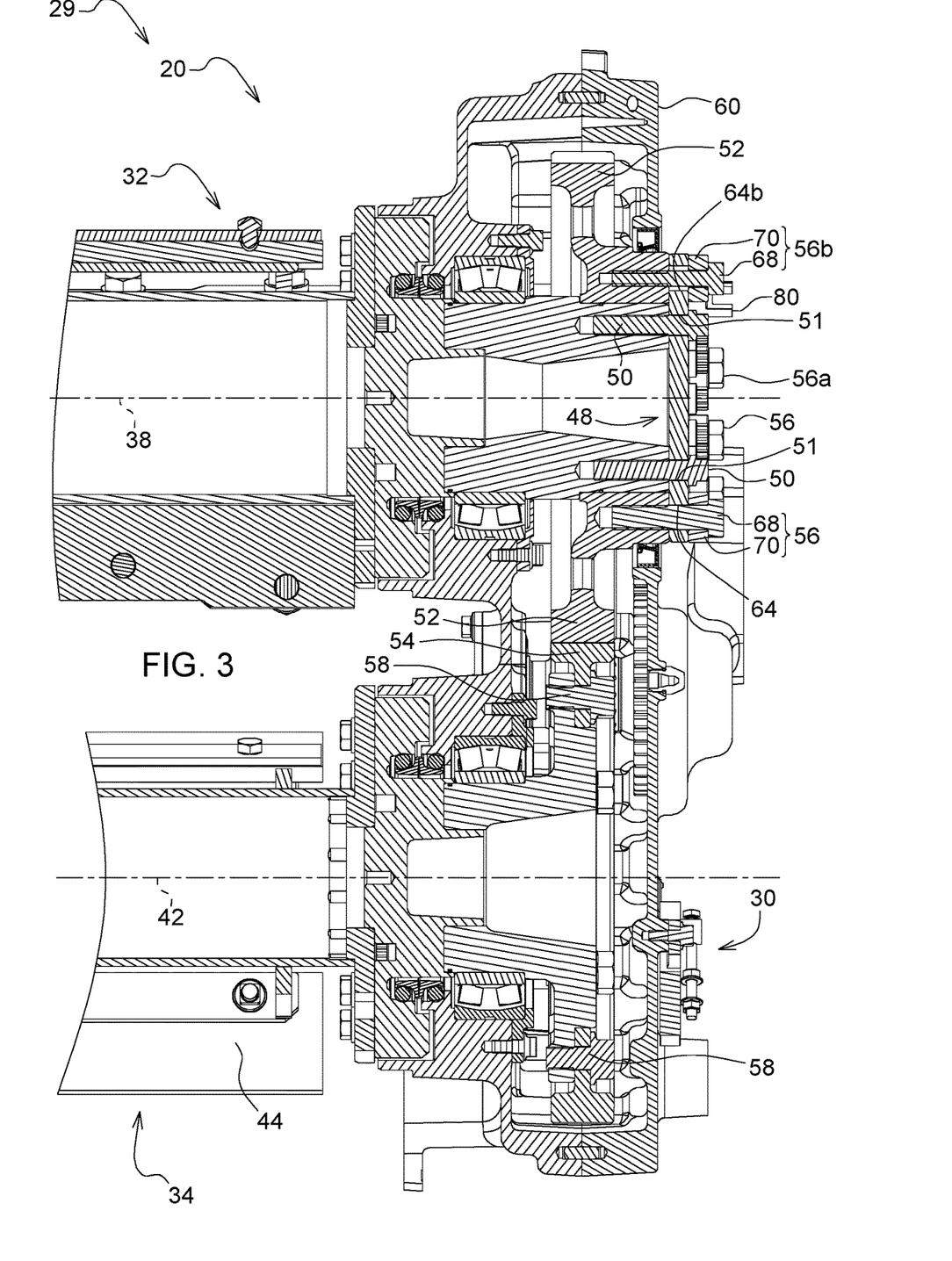
FIG. 3 is a sectional view taken along lines 3-3 of FIG. 2, with portions broken away, showing a gearbox that coordinates rotation of the first and second chopper drums relative to one another to establish a timing of operation between the blades of the first chopper drum and the blades of the second chopper drum.

Referring to FIGS. 2 and 3, the chopper 20 is included in a chopper system 29. The chopper system 29 includes a timing-adjustment tool 30 for adjusting a timing of operation of the chopper 20, discussed further herein.

The chopper 20 includes a first chopper drum 32 and a second chopper drum 34. The first chopper drum 32 is mounted to the frame 36 of the harvester 10 for rotation about a first axis of rotation 38. The first chopper drum 32 includes blades 40 extending axially relative to the axis 38 and spaced about the axis 38. The second chopper drum 34 is mounted to the frame 36 for rotation about a second axis of rotation 42. The second chopper drum 34 includes blades 42 extending axially relative to the axis 42 and spaced about the axis 42. The blades 40 of the first chopper drum 32 and the blades 44 of the second chopper drum 34 cooperate to sever sugarcane stalks into billets upon rotation of the first and second chopper drums 32, 34 respectively about the first and second axes of rotation 38, 42.

The chopper 20 includes a gearbox 46. The gearbox 46 coordinates rotation of the first and second chopper drums 32, 34 relative to one another to establish a timing of operation between the blades 40 of the first chopper drum 32 and the blades 44 of the second chopper drum 34 in order to cut the stalks into billets effectively.

The gearbox 46 includes a rotor 48. The rotor 48 is connected to the first chopper drum 32 to rotate therewith about the first axis of rotation 38. An array of fasteners 50 of the gearbox 46 fasten the rotor 48 to the first chopper drum 32 in fixed relation thereto. The fasteners 50 extend through respective apertures 51 of the rotor 48 (e.g., unthreaded circular apertures) into respective threaded apertures of the first chopper drum 32.

The gearbox 46 includes a first gear 52 and a second gear 54. An array of fasteners 56 fasten the rotor 48 to the first gear 52 for rotation of the first gear 52 with the first chopper drum 32 about the first axis of rotation 38. The second gear 54 is connected to the second chopper drum 34 to rotate therewith about the second axis of rotation 42. An array of fasteners 58 of the gearbox 46 fasten the second gear 54 to the second chopper drum 34 in fixed relation thereto.

The first and second gears 52, 54 are rotatably connected with one another. Illustratively, the first and second gears 52, 54 are in mesh with one another. In other embodiments, one or more other gears or other motion gearbox elements may interconnect the gears 52, 54.

The gearbox 46 includes a housing 60. The first and second gears 52, 54, are positioned in the housing 60. The rotor 48 is exposed outside the housing 60 to facilitate adjustment of the timing of operation between the first and second chopper drums 32, 34.

The gearbox 46 may include an input gear 62 and an output shaft 63. The input gear 62 may receive a rotary input that drives the chopper 20. The internally-splined input gear 62 may drive a set of gears that, in turn, drives the second gear 54. The set of gears may include a gear that is positioned on the same shaft as the input gear 62 and meshes with a larger-diameter gear on another shaft. A smaller-diameter gear may be on the same shaft as the larger-diameter gear and may mesh with the second gear 54. The second gear 54, in turn, drives the first gear 52 during operation of the chopper 20. The output shaft 63 may drives a flywheel, used to store energy that can be used in a high-torque event. The second gear 54 may mesh with a smaller-diameter gear on the output shaft 63 or otherwise fixed thereto. It is to be understood that the gearing of the gearbox 46 may be configured in a wide variety of ways.

The blades 40, 44 may wear over time with use. The timing of operation between the blades 40 of the first chopper drum 32 and the blades 44 of the second chopper drum 34 could be affected by such wear, impacting the cut quality of the chopper 20. The chopper 20 is configured to allow adjustment of the timing of operation between the blades 40 of the first chopper drum 32 and the blades 44 of the second chopper drum 34.

The rotor 48 is normally fixed to the first gear 52, but can be released for timing adjustment. The rotor 48 is normally fastened to the first gear 52 with the fasteners 56 in fixed relation to the first gear 52. The rotor 48 is so fixed, for example, during use of the chopper 20 to sever stalks into billets. To adjust timing, the rotor 48 can be rotated relative to the first gear 52 upon loosening of the fasteners 56. Such rotation of the rotor 48 causes the first chopper drum 32 and its blades 40 to rotate about the first axis 38 relative to the second chopper drum 34 and its blades 44.

To enable rotation of the rotor 48 relative to the first gear 52, the fasteners 56 can, for example, be partially withdrawn from the first gear 52 such that the rotor 48 is no longer fixed to the first gear 52 but rotatable relative thereto. The rotor 48 includes an array of slots 64 formed in a disk 66 of the rotor 48. The pattern of the slots 64 matches the pattern of the fasteners 56, such that the fasteners 56 extend respectively through the slots 64. The rotor 48 and its slots 64 can rotate about the axis 38 relative to the fasteners 56 extending respectively through the slots 56 upon loosening of the fasteners 56. The slots 64 are arcuate to promote such rotation of the rotor 48 and slots 64.

Each fastener 56 includes a bolt 68 and a spacer 70. The bolt 68 extends through the spacer 70 and the respective slot 64 into threaded engagement with the first gear 52. The shank of the bolt 68 is threaded tightly to the corresponding threaded aperture of the first gear 52 so as to capture the spacer 70 between and against the head of the bolt 68 and the disk 66 of the rotor 48 in frictional engagement with the head and the disk 66, to thereby fix the rotor 48 to the first gear 52. Loosening the bolts 68 releases the spacers 70 so that the rotor 48 can be rotated for timing adjustment.

Figure 4:
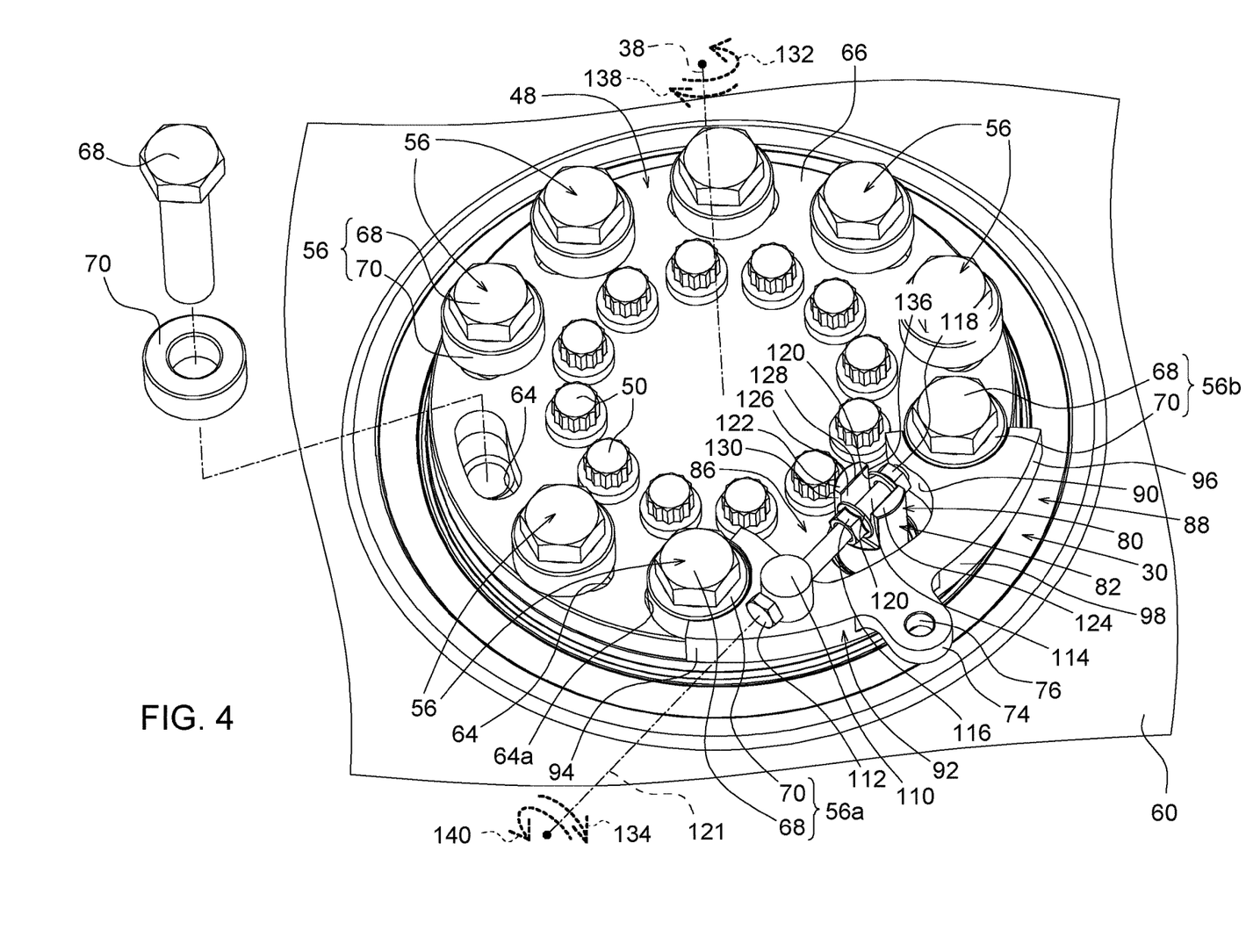
FIG. 4 is a perspective view showing a timing-adjustment tool that adjusts the timing of operation between the blades of the first chopper drum and the blades of the second chopper drum.

Referring to FIGS. 2-4, a person can use the timing-adjustment tool to adjust the timing of operation between the blades 40 of the first chopper drum 32 and the blades 44 of the second chopper drum 34. The tool 30 can be stored in a storage position in an accessible location, such as, for example, on the housing 60. The tool 30 includes an attachment point 74 adapted to connect to the housing 60. The attachment point 74 includes an aperture 76 through which a fastener 78 (e.g., threaded bolt) extends into the housing 60 to mount the tool 30 to the housing 60.

Referring to FIG. 4, the tool 30 removably mounts to a first fastener 56a of the fasteners 56, a second fastener 56b of the fasteners 56, and the rotor 48 to rotate the rotor 48 relative to the first gear 52 to adjust the timing of operation between the blades 40 of the first chopper drum 32 and the blades 44 of the second chopper drum 34 when the fasteners 56 are loosened. The first fastener 56a extends through a first slot 64a of the slots 64, and the second fastener 56b extends through a second slot 64b of the slots 64. The tool 30 may be so mounted by a person to adjust the timing.

The rotor 48 includes an anchor 80. The anchor 80 is positioned between the first and second fasteners 56a, 56b and is fixed to the disk 66.

Figure 5:
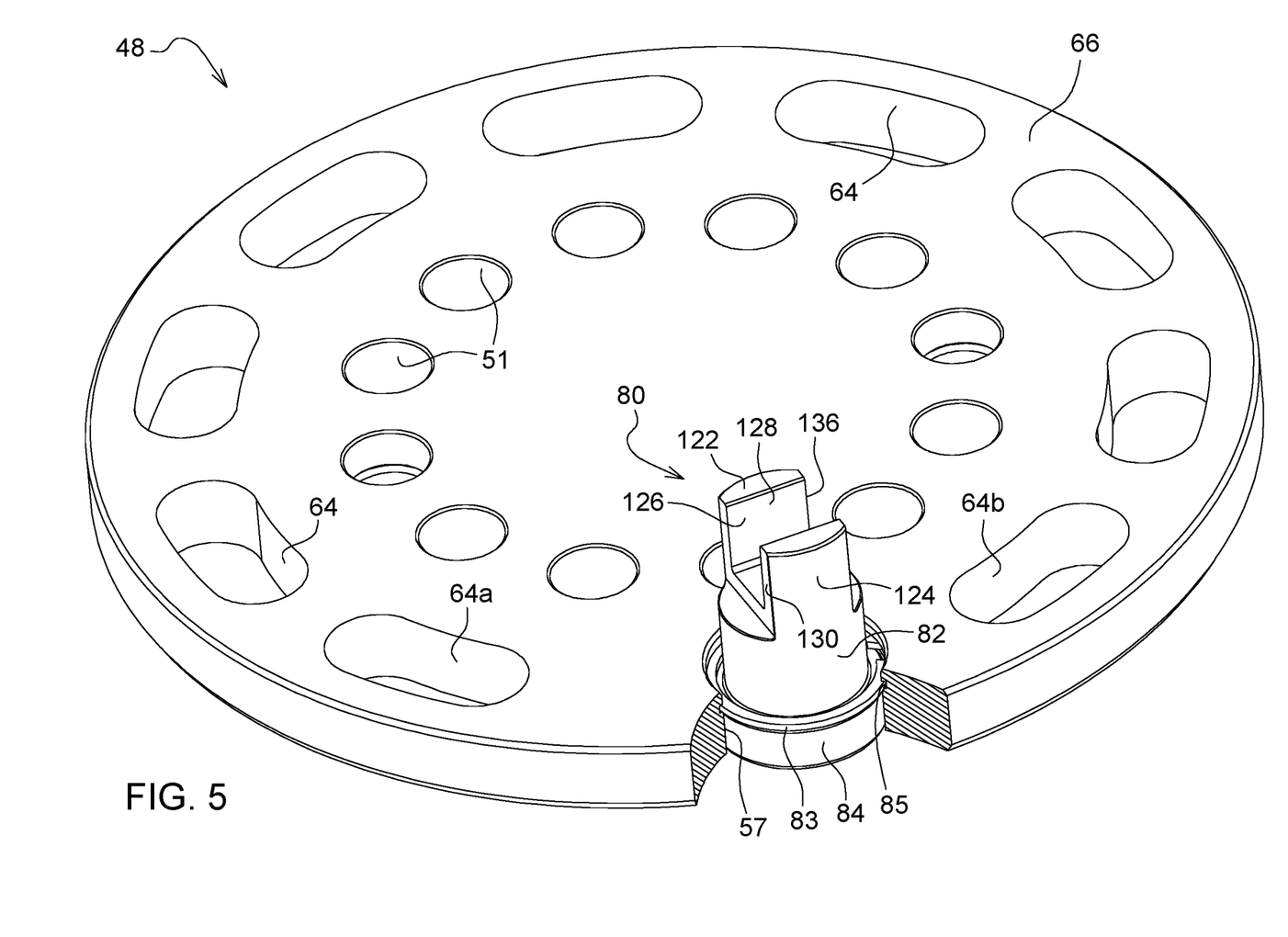
FIG. 5 is a perspective view, with portions broken away, showing a rotor of the gearbox.

Referring to FIG. 5, the anchor 80 includes a tower 82, a snap ring 83, and a base 84. The base 84 is positioned in an aperture 57 of the disk 66 (e.g., circular aperture), and is wider in diameter than the tower 82 so as to include a neckdown portion in the form of an annular shoulder that contacts the snap ring 83. The base 84 is captured between the snap ring 83, position in a groove 85 of the aperture 57, and the first gear 52. The tower 82 extends axially from the base 84 away from the disk 66 relative to the axis 38. The tower 82 and the base 84 are constructed as a single-piece construction. In other embodiments, the tower 82 and the base 84 may be configured as separate components.

Referring back to FIG. 4, the tool 30 is supported on the first fastener 56a and the second fastener 56b and is operatively connected to the anchor 80. The tool 30 includes an adjuster 86 that connects to the anchor 80 and an adjuster support 88 that mounts to the first fastener 56a and the second fastener 56b and supports the adjuster 86. The adjuster support 88 includes a pocket 90 in which the anchor 80 is positioned when the adjuster support 88 is mounted to the first and second fasteners 56a, 56b.

The adjuster support 88 includes a brace 92. The brace 92 engages the first fastener 56a and the second fastener 56b and defines the pocket 90 in which the anchor 80 is positioned. The brace 92 includes a first engagement portion 94, configured, for example, as an open hand, adapted to cup the first fastener 56a, a second engagement portion, configured, for example, as an open hand, adapted to cup the second fastener 56b, and a body 98 interconnecting the first engagement portion 94 and the second engagement portion 96. Illustratively, when the tool 30 is mounted to the first and second fasteners 56a, 56b in its use position, the first engagement portion 94 cups the first fastener 56a, and the second engagement portion 96 cups the second fastener 56b. The brace 92 engages the spacers 70 of the first and second fasteners 56a, 56b, with the first engagement portion 94 cupping the spacer 70 of the first fastener 56a and the second engagement portion 96 cupping the spacer 70 of the second fastener 56b. The engagement portions 94, 96 may extend more or less about the respective spacers 70.

Figure 6:
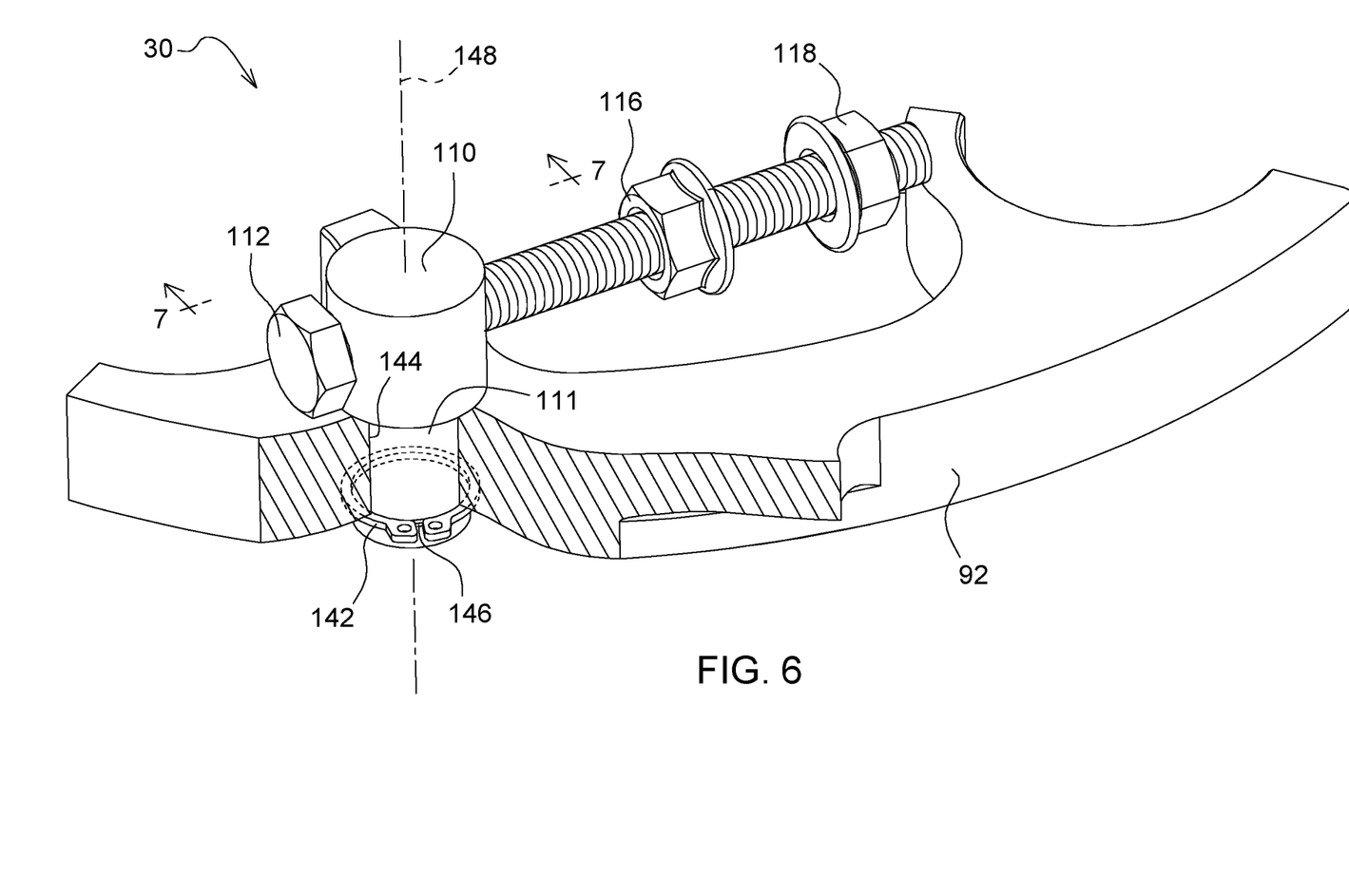
FIG. 6 is a perspective view of the timing-adjustment tool, with portions broken away, showing an adjustment bolt supported by a threaded boss, and showing rotatable mounting of the boss to a brace of the tool.
Figure 7:
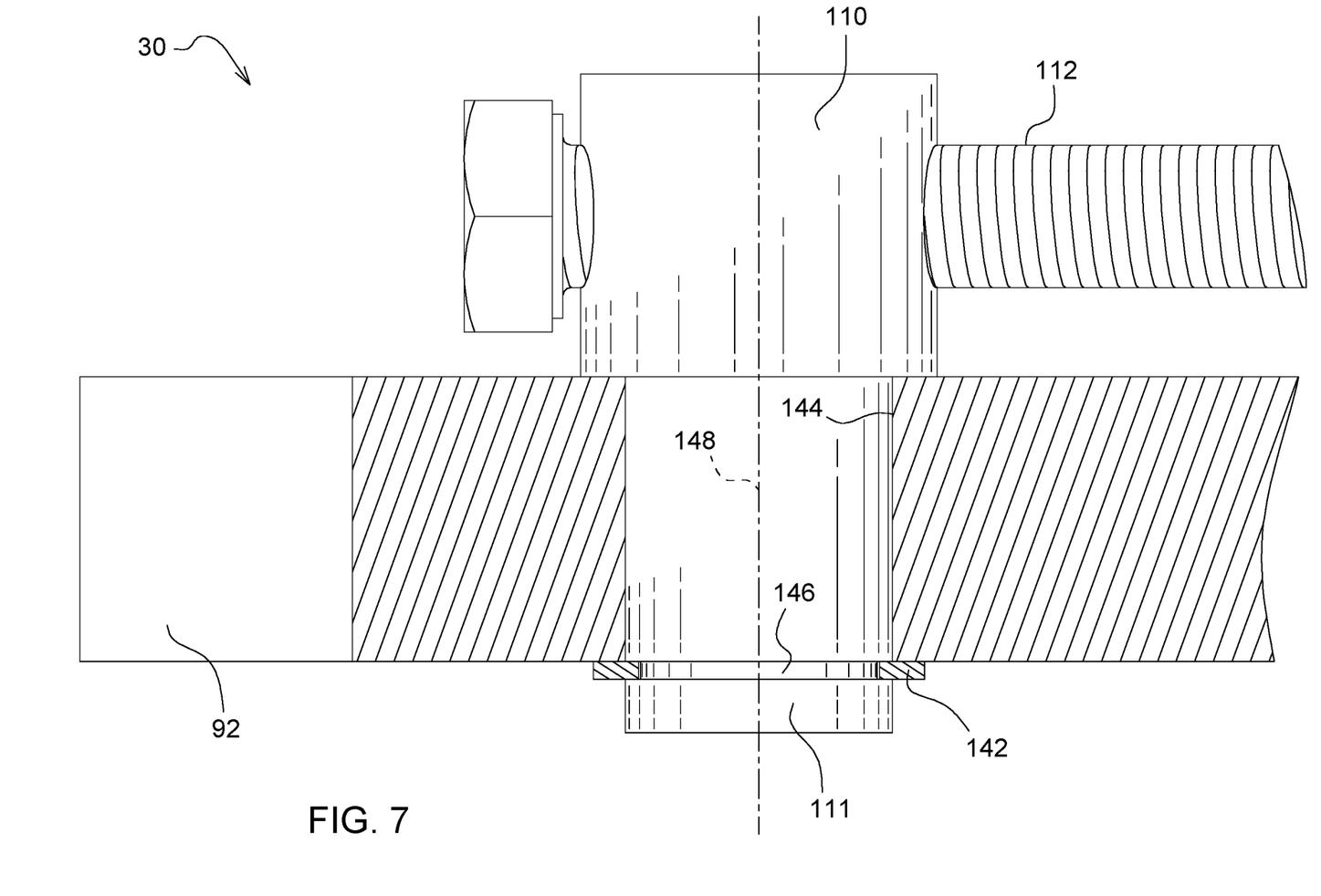
FIG. 7 is an elevation view, partly in section along lines 7-7 of FIG. 6, with portions broken away, showing a mounting pin rotatably positioned in an aperture of the brace (in section) for rotatably mounting the boss and the adjustment bolt threaded to the boss, with a snap ring (in section) for retaining the mounting pin in the aperture.

Referring to FIGS. 4 and 6-7, the adjuster support 88 includes an internally threaded boss 110. The boss 110 is connected to the brace 92 such that the boss 110 projects from the brace axially relative to the axis 38. The boss 110 projects away from the body 98 of the brace 92 from a location in proximity to the first engagement portion 94.

The threaded boss 110 is rotatably connected to the brace 92 with, for example, a mounting pin 111 and a snap ring 142. The mounting pin 111 is smaller in diameter than the boss 110 and is positioned in an aperture 144 of the brace 92. The snap ring 142 blocks removal of the pin 111 from the aperture 144.

In the illustrated embodiment, the aperture 144 extends through the brace 92, and the pin 111 extends from the boss 110 through the aperture 144. The pin 111 has an annular groove 146 in which the snap ring 142 is positioned and mounted to the pin 111 to block removal of the pin 111 from the aperture 144. The boss 110 blocks removal of the pin 111 from the aperture 114 at the other end. The boss 110 is able to rotate about an axis 148 of the boss 110 and pin 111. The threaded boss 110 and the mounting pin 111 are integrated with one another so as to provide a one-piece construction. In other embodiments, the boss 110 and the pin 111 may be distinct pieces that are coupled to one another.

Referring to FIG. 4, the adjuster 86 includes an adjustment bolt 112 that operatively connects to the anchor 80. The adjustment bolt 112 is operatively connected to the anchor 80 to rotate the rotor 48 in response to rotation of the adjustment bolt 112 when the tool 30 is in its use position mounted to the fasteners 56a, 56b.

The adjustment bolt 112 is mounted to the boss 110. A shank 114 is threaded to and extends through the boss 110.

The adjuster 86 includes a first nut 116 and a second nut 118. The first and second nuts 116, 118 are threaded to the shank 114 of the adjustment bolt 112 and are spaced apart from one another. The first nut 116 has a first orientation on the bolt 112, and the second nut 118 has an opposite second orientation on the bolt 112. Each nut 116, 118 may be configured, for example, as a mounting nut with an annular flange 120.

The first and second nuts 116, 118 interface with the anchor 80 to rotate the first and second slots 64a, 64b respectively relative to the first and second fasteners 56a, 56b to rotate the rotor 48 relative to the first gear 52 in response to rotation of the adjustment bolt 112 about its own axis 121. The nuts 116, 118 interface with the tower 82 to so rotate the first and second slots 64a, 64b. The tower 82 is positioned between the first and second nuts 116, 118. The tower 82 includes a first lug 122 and a second lug 124. The first and second lugs 122, 124 cooperate to define a gap 126 therebetween to receive the shank 114 of the adjustment bolt 112 and an opening 128 into the gap 126 for passage of the shank 114 through the opening 128 into and out of the gap 126 during assembly and disassembly of the tool 30 to and from the first and second fasteners 56a, 56b. During assembly, the boss 110 can be rotated about the axis 148 of the boss 110 and mounting pin 111 as needed to align the adjustment bolt 112 with the opening 128 and the gap 126 of the tower 82.

The nuts 116, 118 apply pressure to the tower 82 to rotate the rotor 48 in response to rotation of the adjustment bolt 112. The first nut 116 is adapted to press against a first side 130 of the first and second lugs 122, 124 to rotate the rotor 48 in a first direction 132 about the first axis of rotation 38. The flange 120 of the first nut 116 presses against the first side 130 of the lugs 122, 124 to so rotate the rotor 48 in response to rotation of the adjustment bolt 112 in a first direction 134 about the bolt axis 121. The second nut 118 is adapted to press against a second side 136 of the first and second lugs 122, 124 opposite to the first side 130 to rotate the rotor 48 in a second direction 138 about the axis 38 opposite to the first direction 132. The flange 120 of the second nut 118 presses against the second side 136 of the lugs 122, 124 to so rotate the rotor 48 in response to rotation of the adjustment bolt 112 in a second direction 140 about the bolt axis 121.

During use of the chopper 20, the tool 30 can be stored in its storage position on the housing 60. The adjuster support 88 includes the attachment point 74. The attachment point 74 projects from the body 98 and is connected to the housing 60 with the fastener 78. The attachment point 74 may be configured as a tab integrated with the body 98 and including the aperture 76 for the fastener 78.

The tool 30 can be released from its storage position when it is desired to adjust the chopper timing. A person can remove the fastener 78 from the housing 60 to free the tool 30 from the housing 60.

The tool 30 can then be mounted in its use position. A person orients the tool 30 in register with the first and second fasteners 56a, 56b and the tower 82 before mounting the tool 30 thereto. The engagement portions 94, 96 are oriented respectively relative to the first and second fasteners 56a, 56b, and the adjustment bolt 112 and the nuts 116, 118 are oriented relative to the tower 82. The boss 110 can be rotated about the axis 148 to facilitate alignment of the adjustment bolt 112 and nuts 116, 118 relative to the tower 82. The tool 30 is then positioned in its use position, with the first and second fasteners 56a, 56b received respectively by the engagement portions 94, 96 and the shank 114 of the adjustment bolt 112 received through the opening 128 into the gap 126 such that the nuts 116, 118 are positioned on opposite sides 130, 136 of the lugs 122, 124. The adjustment bolt 112 can then be rotated in the first or second direction 134, 140 about the bolt axis 121 as desired to rotate the rotor 48 and the first chopper drum 32 fixed thereto in the corresponding first or second direction 132, 138 about the axis of rotation 38 to adjust the timing between the blades 40 of the first chopper drum 32 and the blades 44 of the second chopper drum 34. The boss 110 is rotatably mounted to the brace 92 via the pin 111 to enable rotation of the adjustment bolt 112 about the axis 148 of the boss 110 and pin 111 in response rotation of the rotor 48 about the axis 38 of the first chopper drum 32. The tool 30 enables fine tuning adjustment to timing. Because the tool 30 is external to the chopper 20, damage to the tool 30 in high-load events is avoided.

In a second embodiment of the timing-adjustment tool, the tool has a single engagement portion, rather two engagement portions. As such, the adjuster support is modified from the adjuster support 88, while the adjuster is similar to the adjuster 86. The boss of the adjuster support is connected to the engagement portion, for threaded mounting of the adjustment bolt to the boss.

The single engagement portion engages the fastener 56a, such as, for example, the spacer 70 of the fastener 56a. The engagement portion may extend more or less about the spacer 70. For example, the engagement portion is configured as an open hand that cups the spacer 70, without encircling the fastener 56a. In another embodiment, the engagement portion surrounds the fastener 56a so as to encircle the fastener 56a and the spacer 70 thereof. In such a case, rotation of the adjustment bolt 112 in the directions 134, 140 about the bolt axis 121 causes respectively the nuts 116, 118 to move the tower 82, and thus the rotor 48, in the directions 132, 138 about the first axis of rotation 38.

It is to be understood that, although threads are not shown in the drawings for ease of illustration (except for the adjustment bolt 112 in FIGS. 6 and 7 where threads are shown diagrammatically), the chopper system 29 would include threads in connection with various components, such as, for example, fasteners 50, 56, 58, 78, adjustment bolt 112, and nuts 116, 118 and corresponding portions to which they are threaded. It is to be understood that the hatching in the drawings is general in nature, rather than material-specific.

While the above describes example embodiments of the present disclosure, these descriptions should not be viewed in a limiting sense. Rather, other variations and modifications may be made without departing from the scope and spirit of the present disclosure as defined in the appended claims.

What is claimed is:

1. A chopper system for a sugarcane harvester, comprising:
   a chopper including:
      a first chopper drum mounted for rotation about a first axis of rotation and comprising blades,
      a second chopper drum mounted for rotation about a second axis of rotation and comprising blades that cooperate with the blades of the first chopper drum to sever sugarcane stalks into billets upon rotation of the first and second chopper drums respectively about the first and second axes of rotation, and
      a gearbox that coordinates rotation of the first and second chopper drums relative to one another to establish a timing of operation between the blades of the first chopper drum and the blades of the second chopper drum, the gearbox comprising a rotor connected to the first chopper drum to rotate therewith, a first gear, fasteners fastening the rotor to the first gear for rotation of the first gear with the first chopper drum, and a second gear connected to the second chopper drum to rotate therewith, the first and second gears rotatably connected with one another, the rotor rotatable relative to the first gear upon loosening of the fasteners,
   a timing-adjustment tool that removably mounts to a first fastener of the fasteners and the rotor to rotate the rotor relative to the first gear to adjust the timing of operation between the blades of the first chopper drum and the blades of the second chopper drum when the fasteners are loosened; and
   wherein the rotor comprises an anchor, and the timing-adjustment tool comprises an adjustment bolt that operatively connects to the anchor.

2. The chopper system of claim 1, comprising a first nut and a second nut, wherein the adjustment bolt comprises a shank, the anchor comprises a tower, the first and second nuts are threaded to the shank and are spaced apart from one another, and the tower is positioned between the first and second nuts.

3. The chopper system of claim 2, wherein the tower comprises a first lug and a second lug, the first and second lugs cooperate to define a gap therebetween to receive the shank and an opening into the gap for passage of the shank through the opening into and out of the gap.

4. The chopper system of claim 3, wherein the first nut is adapted to press against a first side of the first and second lugs to rotate the rotor in a first direction, and the second nut is adapted to press against an opposite second side of the first and second lugs to rotate the rotor in an opposite second direction.

5. A chopper system for a sugarcane harvester, comprising:
   a chopper including:
      a first chopper drum mounted for rotation about a first axis of rotation and comprising blades;
      a second chopper drum mounted for rotation about a second axis of rotation and comprising blades that cooperate with the blades of the first chopper drum to sever sugarcane stalks into billets upon rotation of the first and second chopper drums respectively about the first and second axes of rotation; and
      a gearbox that coordinates rotation of the first and second chopper drums relative to one another to establish a timing of operation between the blades of the first chopper drum and the blades of the second chopper drum, the gearbox comprising a rotor connected to the first chopper drum to rotate therewith, a first gear, fasteners fastening the rotor to the first gear for rotation of the first gear with the first chopper drum, and a second gear connected to the second chopper drum to rotate therewith, the first and second gears rotatably connected with one another, the rotor rotatable relative to the first gear upon loosening of the fasteners;
   a timing-adjustment tool that removably mounts to a first fastener of the fasteners and the rotor to rotate the rotor relative to the first gear to adjust the timing of operation between the blades of the first chopper drum and the blades of the second chopper drum when the fasteners are loosened; and
   wherein the rotor includes an anchor, and the timing-adjustment tool includes an adjuster that connects to the anchor and an adjuster support that mounts to the first fastener and a second fastener and supports the adjuster.

6. The chopper system of claim 5, wherein the anchor is positioned between the first and second fasteners, and the adjuster support comprises a pocket in which the anchor is positioned when the adjuster support is mounted to the first and second fasteners.

7. The chopper system of claim 5, wherein the adjuster support comprises a brace that engages the first fastener and the second fastener.

8. The chopper system of claim 5, wherein the rotor comprises a first slot through which the first fastener extends and a second slot through which the second fastener extends, the adjuster comprises an adjustment bolt threaded to the adjuster support and a nut that is threaded to the adjustment bolt and interfaces with the anchor to rotate the first and second slots respectively relative to the first and second fasteners to rotate the rotor relative to the first gear in response to rotation of the adjustment bolt.

9. The chopper system of claim 7, wherein the gearbox comprises a housing in which the first gear and the second gear are positioned, and the adjuster support comprises an attachment point projecting therefrom and adapted to connect to the housing.

10. A chopper system for a sugarcane harvester, comprising:
   a chopper including:
      a first chopper drum mounted for rotation about a first axis of rotation and comprising blades;
      a second chopper drum mounted for rotation about a second axis of rotation and comprising blades that cooperate with the blades of the first chopper drum to sever sugarcane stalks into billets upon rotation of the first and second chopper drums respectively about the first and second axes of rotation; and
      a gearbox that coordinates rotation of the first and second chopper drums relative to one another to establish a timing of operation between the blades of the first chopper drum and the blades of the second chopper drum, the gearbox comprising a rotor connected to the first chopper drum to rotate therewith, a first gear, fasteners fastening the rotor to the first gear for rotation of the first gear with the first chopper drum, and a second gear connected to the second chopper drum to rotate therewith, the first and second gears rotatably connected with one another, the rotor rotatable relative to the first gear upon loosening of the fasteners;
   a timing-adjustment tool that removably mounts to a first fastener of the fasteners and the rotor to rotate the rotor relative to the first gear to adjust the timing of operation between the blades of the first chopper drum and the blades of the second chopper drum when the fasteners are loosened; and
   wherein the timing-adjustment tool is mounted to the first fastener, a second fastener of the fasteners, and the rotor.

11. The chopper system of claim 10, wherein the timing-adjustment tool is supported on the first fastener and the second fastener and is operatively connected to an anchor of the rotor, the first fastener extends through a first slot of the rotor, and the second fastener extends through a second slot of the rotor.

12. The chopper system of claim 11, wherein the timing-adjustment tool comprises a first hand cupping a spacer of the first fastener, a second hand cupping a spacer of the second fastener, and a body interconnecting the first hand and the second hand.

13. The chopper system of claim 12, wherein the timing-adjustment tool comprises a boss rotatably connected to and projecting away from the body, an adjustment bolt threaded to the boss, and a nut threaded to the adjustment bolt and interfacing with a tower of the rotor to rotate the first and second slots respectively relative to the first and second fasteners in response to rotation of the adjustment bolt.

14. The chopper system of claim 10, wherein the rotor comprises an anchor, and the timing-adjustment tool comprises an adjustment bolt operatively connected to the anchor to rotate the rotor in response to rotation of the adjustment bolt.

* * * * *